United States Patent
Mueller et al.

[19]

[11] Patent Number: 5,918,697
[45] Date of Patent: Jul. 6, 1999

[54] OPERATING-ELEMENT CONTROL ARRANGEMENT FOR MOTOR VEHICLE LONGITUDINAL MOVEMENT

[75] Inventors: Manfred Mueller, Nuremberg; Werner Reichelt, Esslingen; Peter Frank, Stuttgart, all of Germany

[73] Assignee: Daimler-Benz AG, Germany

[21] Appl. No.: 08/774,724

[22] Filed: Jan. 3, 1997

[30] Foreign Application Priority Data

Jan. 4, 1996 [DE] Germany .......................... 196 00 138

[51] Int. Cl.⁶ .................................................. B60K 26/00
[52] U.S. Cl. ........................ 180/333; 180/334; 180/315
[58] Field of Search ................................... 180/333, 334, 180/315, 332, 336

[56] References Cited

U.S. PATENT DOCUMENTS

| | | |
|---|---|---|
| 3,022,850 | 2/1962 | Bidwell et al. .............................. 180/77 |
| 3,924,458 | 12/1975 | Woodworth et al. .................. 73/133 R |
| 4,040,499 | 8/1977 | Kestian et al. ........................... 180/333 |
| 4,046,005 | 9/1977 | Goroski .................................. 73/133 R |
| 4,093,953 | 6/1978 | Hammons et al. ...................... 343/225 |
| 5,086,870 | 2/1992 | Bolduc .................................... 180/333 |
| 5,553,684 | 9/1996 | Bolduc .................................... 180/333 |

FOREIGN PATENT DOCUMENTS

| | | |
|---|---|---|
| 0 137 610 A1 | 4/1985 | European Pat. Off. . |
| 0 209 400 A2 | 7/1986 | European Pat. Off. . |
| 44 04 594 A1 | 8/1995 | Germany . |
| 4404594A1 | 8/1995 | Germany . |
| 2110428 | 6/1983 | United Kingdom . |

OTHER PUBLICATIONS

Arbeitslatz Fahrer Eine ergonomische Studie, H. Bubb, Automobil–Industrie Mar. 1985, pp. 265–275.
XP00618798, Bubb H: "Arbeitsplatz Fahrer Eine Ergonomische Studie," Automobil—Industrie, 1985, pp. 265–275.
XP002056674, "Improved Active and Passive Safety by a Using Acting Lateral Dynamic Control and an Unconventional Steering Unit," Proceedings, vol. 1, 4–7, Nov. 1991, pp. 224–230.
Search Report, France, Mar. 13, 1998.

*Primary Examiner*—J. Woodrow Eldred
*Attorney, Agent, or Firm*—Evenson, McKeown, Edwards & Lenahan, P.L.L.C.

[57] ABSTRACT

An operating-element arrangement has a user-actuatable operating element which, when actuated in a first actuation direction, brings about an increase in the longitudinal direction of a motor vehicle. When actuated in a second actuation direction opposite to the first direction, the arrangement brings about a reduction in the longitudinal movement of the vehicle. The actuating force exerted on the operating element determines the change in longitudinal movement to be brought about. The rest position of the operating element is displaced in dependence on the longitudinal movement of the vehicle. The user consequently receives a perceptible and/or visible acknowledgement of the respective vehicle speed or of the deviation between the actual and the desired speed. Alternatively, the operating element can be configured isometrically, in that it remains in a fixed position irrespective of the actuating force.

4 Claims, 1 Drawing Sheet

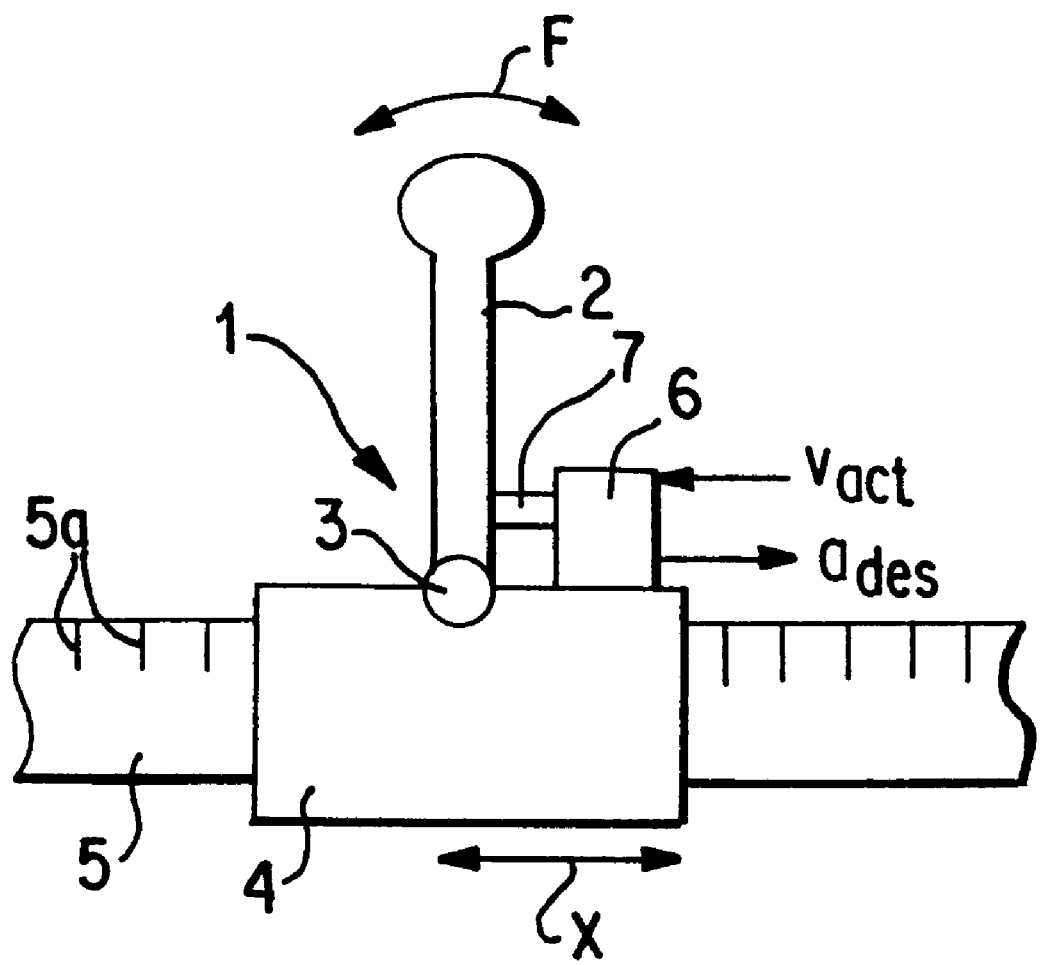

OPERATING-ELEMENT CONTROL ARRANGEMENT FOR MOTOR VEHICLE LONGITUDINAL MOVEMENT

CROSS-REFERENCE TO RELATED APPLICATIONS

This application is related to application Ser. No. 08/781,987 filed Jan. 6, 1997 in the name of Manfred MUELLER et al. for SETTING-ELEMENT CONTROL ARRANGEMENT AND METHOD FOR MOTOR VEHICLE LONGITUDINAL SPEED AND/OR THE STEERING ANGLE.

BACKGROUND AND SUMMARY OF THE INVENTION

The present invention relates to an operating-element arrangement for controlling the longitudinal movement of a motor vehicle, and more particularly, to an arrangement with a user-actuatable operating element which, when actuated in a first actuation direction, brings about an increase in and, when actuated in a second actuation direction opposite to the first, brings about a reduction in the longitudinal movement of the vehicle. The actuating force exerted on the operating element determines the change in longitudinal movement to be brought about, and the position of rest of the operating element is displaced in dependence on the longitudinal movement of the vehicle.

In known operating-element arrangements, one user-actuatable operating element, preferably a manually operable control stick, serves both for the positive acceleration and for the deceleration of the vehicle, thereby dispensing with conventional accelerator and brake pedal equipment.

One such known operating-element arrangement is described in H. Bubb, "Arbeitsplatz Fahrer—Eine ergonomische Studie" [translation, "The Driver's Work Station—An Ergonomic Study"], Automobil-Industrie [translation, Automobile Industry] 3/95, page 265. In this known arrangement, the transverse dynamics are controlled by rotating two plate-like handles of the operating element which are connected mechanically to one another. The longitudinal dynamics are controlled by displacing the operating element which is guided movably via a yoke in a center console. Pushing the operating element forwards causes an increase in the vehicle longitudinal speed, with the acceleration to be attained being determined by the magnitude of the operating force directed forwards. Similarly, deceleration by way of a braking operation is determined by the operating force with which the operating element is pulled backwards. The respective vehicle speed is measured, and the operating element is displaced into a speed-proportional position by a suitable servodrive.

DE 44 04 594 A1 discloses a control stick for the acceleration and/or braking and for the steering of a motor vehicle. To control the vehicle, the control stick can be pivoted through two degrees of freedom of rotation, the axes of which are perpendicular to the longitudinal axis of the control stick and form an angle of 90° with one another. The frictional or restoring forces of the control stick with respect to the degree of freedom of adjustment assigned to the steering can be increased as the driving speed increases.

U.S. Pat. No. 3,022,850 discloses an operating-element arrangement which contains a control stick for controlling both the transverse and the longitudinal dynamics of a motor vehicle. A longitudinal acceleration of the vehicle is requested by pivoting the rotatably mounted control stick forwards out of its essentially vertical rest position, which remains invariable, and a deceleration of the vehicle is correspondingly requested by pulling the control stick backwards.

An object of the present invention is to provide an operating-element arrangement which enables the vehicle driver to have comparatively comfortable control of the longitudinal movement of the vehicle.

This problem has been solved by providing an operating-element arrangement for controlling the longitudinal movement of a motor vehicle in which the operating element can be actuated by the actuating force exerted, counter to the effect of a reaction force exerted on the operating element, into a deflection position corresponding to the desired speed of the vehicle, the reaction force decreasing in dependence on the difference between the desired and the actual speed of the vehicle as the difference diminishes. Alternatively, the arrangement can have the operating element is arranged in such a way that it does not move relative to the vehicle body as a result of the actuating force exerted.

In these arrangements according to the present invention, the actuating force exerted on the user-actuatable operating element determines the change in the longitudinal vehicle movement requested in each case, for example the longitudinal vehicle speed or the longitudinal vehicle acceleration. The vehicle, in turn, complies by way of a corresponding accelerating or braking operation.

In the first-mentioned arrangement according to the present invention, the rest position of the operating element is displaced in dependence on the longitudinal vehicle movement, preferably parallel to the operating-element actuating force exerted and, in particular, parallel to the longitudinal direction of the vehicle. By virtue of this configuration, the vehicle driver receives an acknowledgement of longitudinal movement from the respective position of rest of the operating element. That is, based upon the displacement of the rest position of the operating element, the driver receives perceptible and/or visible information on the desired and/or actual vehicle speed (or acceleration).

The operating element can be deflected by the actuating force exerted in each case. A specific desired speed is assigned in each case to the deflection position assumed in which case the arrangement exerts on the operating element a reaction force which counteracts the actuating force exerted and which is reduced to zero as the difference between the desired and the actual speed of the vehicle decreases.

Consequently, the user receives acknowledgement, by way of force, of the respective instantaneous deviation of the actual speed from the desired speed and therefore of the vehicle acceleration or deceleration to be set. In other words, the vehicle driver will actuate the operating element with the greater force with a greater difference between the new desired speed and the previous or actual speed. As soon as the actual speed has reached the desired speed, the reaction force on the operating element preferably returns to zero, and the new force-free position of rest of the operating element represents the desired longitudinal vehicle speed which has been reached. Alternatively, for even more intuitive acknowledgement, a permanent reaction force which is greater than zero can be assigned to the state of a diminishing speed control difference.

According to another aspect of the present invention, adjustment of the rest position of the operating element takes place in dependence on the respective actual speed of the vehicle. As long as the vehicle driver actuates the operating element, the driver thus senses the displacement of the rest position of the operating element. By, for example, engagement of the driver's hand around the operating element, the driver perceives how the actual speed approaches the desired speed as a result of the vehicle acceleration or deceleration.

The second-mentioned arrangement according to the present invention is one with an isometric operating element. The magnitude of the actuating force serves directly as a measure of the change in the vehicle longitudinal movement. The operating element does not move relative to the vehicle body as a result of the actuating force exerted, but remains held in a fixed position.

BRIEF DESCRIPTION OF THE DRAWINGS

These and other objects, features and advantages of the present invention will become more readily apparent from the following detailed description of currently preferred embodiments when taken in conjunction with the sole FIGURE which is a schematic side view of an operating-element arrangement for controlling the motor vehicle longitudinal movement in accordance with the present invention.

DETAILED DESCRIPTION OF THE DRAWING

The operating-element arrangement 1 of the present invention contains a user-actuatable operating element configured as a carriage 4 having a manually actuatable control stick 2 which is held pivotably on the carriage 4 via a joint 3. The carriage 4 is guided displaceably parallel to the longitudinal direction of the vehicle on a rail 5 which is arranged on a typical center console of the motor vehicle and has graduated scaling 5a for reading off the position of the operating-element carriage 4 on the rail 5.

An operating-element control unit 6 containing a conventional force sensor is located on the carriage 4. Via a sensing member 7 connected to the control stick 2, force sensor senses the actuating force F exerted on the control stick 2. The sensing member 7 can be configured as an essentially rigid element or alternatively an elastically flexible element. From the recorded actuating force F, the control unit 6 determines, by reference to a suitably stored characteristic, an associated desired acceleration value $a_{des}$, positive acceleration values corresponding to an actual vehicle acceleration as well as negative acceleration values corresponding to a vehicle deceleration, i.e. a braking operation.

In keeping with the driver's intuitive association, the operating-element arrangement 1 is configured to request a positive vehicle acceleration when the control stick 2 is pressed forwards (to the right in the sole FIGURE) and a vehicle deceleration or braking when the control stick 2 is pulled backwards (to the left). Via an associated signal output, the control unit 6 transmits the acquired information on the desired acceleration $a_{des}$ to be set to a central vehicle control apparatus (not shown) which activates the drive system or brake system of the motor vehicle in a generally known corresponding way. The control apparatus can be constructed with generally known control principles.

The information on the respective actual motor vehicle speed $v_{act}$ can be supplied to the operating-element control unit 6 via an associated signal input. The actual-speed information is acquired on the vehicle side in the normal way, for example via an associated wheel-speed sensor assembly. The control unit 6 uses this actual-speed information to displace the operating-element carriage 4 and consequently the force-free rest position of the control stick 2 parallel to the x-direction, (the longitudinal direction of the vehicle) on the guide rail 5 in a speed-dependent manner. More than one variation of this approach is possible for the characteristic of this carriage displacement dependent on the vehicle speed. For example, the carriage 4 can be adjusted in direct functional dependence on the actual vehicle speed $v_{act}$, so that, in each case, a specific position of the carriage 4, and consequently also of the control stick 2, in the x-direction along the rail 5 corresponds to a respective actual-speed value. For this purpose, the operating-element arrangement 1 contains a driving and locking unit which can be activated by the control unit 6. Thereby, the carriage 4 can be displaced, under the control of the control unit 6, along the rail 5 and held firmly clamped thereon, without the carriage 4 being displaced along the rail 5 solely as a result of the action of the actuating force F on the control stick 2. A movement of the carriage 4 and consequently of the control stick 2 forwards in the vehicle longitudinal direction (to the right in the sole FIGURE) is a speed increase and a displacement of the carriage 4 backwards, in the vehicle longitudinal direction of the vehicle (to the left in the sole FIGURE) is a speed reduction.

Alternatively, when an actuating force F acts on the control stick 2, the control unit 6 provides a displacement of the carriage 4 along the rail 5. The displacement then is brought about by this actuating force F. At the same time, by the appropriate activation of a reaction-force mechanism, provided for this purpose between the carriage 4 and the rail 5, a reaction force occurs on the carriage 4 which is dependent on the difference between the desired speed and actual speed $v_{act}$ and which counteracts the actuating force F.

The magnitude of the reaction force gives the user a detectable acknowledgement as to how far the actual speed $v_{act}$ still differs from the desired speed in each situation. As the actual speed $v_{act}$ increasingly approaches the desired speed of the vehicle, the control unit 6 reduces this reaction force, until the latter returns to zero when the vehicle has reached the desired speed. The vehicle driver can subsequently release the control stick 2. Thereupon, the carriage 4, together with the control stick 2, remains on the rail 5 in the new position, which thus corresponds to the new force-free rest position of the operating element 2, 4. The new rest position represents the new desired vehicle speed.

In the above-described embodiments, the operating-element arrangement shown gives the vehicle driver a perceptible and visible acknowledgement of the vehicle longitudinal speed from the respective position of the operating element in the longitudinal direction of the vehicle. Through the driver's hand which engages around the control stick 2, the driver perceives, from the longitudinal displacement movement of the control stick 2 connected to the carriage 4 and, if appropriate, additionally via the effect of the reaction force on the control stick 2, how the vehicle reacts to the requested speed change, i.e. how the actual speed approaches the desired speed. In this case, in the acceleration-free vehicle state, with the force-free rest position of the operating element representing in each case the desired vehicle speed.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Operating-element arrangement for controlling longitudinal movement of a motor vehicle, comprising a user-actuatable operating element configured to effect an increase in the longitudinal movement when actuated in a first actuation direction and to effect a decrease in the longitudinal movement when actuated in a second actuation direction opposite to the first actuation direction, means for using an actuating force exerted on the operating element during actuation in the first and second actuating directions to determine a change in desired longitudinal movement and for displacing a rest position of the operating element in dependence on the longitudinal movement, and means for producing a reaction force on the operating element counter to the actuating force exerted on the operating element to move the operating element into a deflection position corresponding to the desired longitudinal movement such that the reaction force decreases in dependence on a diminishing difference between the desired and the actual longitudinal movement.

2. The operating-element arrangement according to claim 1, wherein the operating element is configured to have a rest position displaced parallel to the direction of the actuating force in dependence on actual vehicle speed.

3. Method for controlling longitudinal movement of a motor vehicle, comprising the steps of actuating an operating element in a first direction to effect an increase in the longitudinal movement and in a second direction opposite to the first direction to effect a decrease in the longitudinal movement, using a force exerted on the operating element as a result of the actuating step to determine a change in desired longitudinal movement, displacing a rest position of the operating element in dependence upon the longitudinal movement, and producing a reaction force on the operating element counter to the exerted force, which reaction force decreases as a difference between desired and actual longitudinal movement decreases.

4. The method according to claim 3, further comprising the step of displacing a rest position of the operating element parallel to a direction of the exerted force in dependence on actual speed of the motor vehicle.

* * * * *